(12) United States Patent
Rhee et al.

(10) Patent No.: US 7,451,448 B1
(45) Date of Patent: Nov. 11, 2008

(54) METHODS FOR SELECTIVELY QUIESCING A COMPUTER SYSTEM

(75) Inventors: Ann Rhee, Foster City, CA (US); Sumanta Chatterjee, Fremont, CA (US); Juan Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 718 days.

(21) Appl. No.: 09/967,068

(22) Filed: Sep. 27, 2001

Related U.S. Application Data

(63) Continuation-in-part of application No. 09/141,664, filed on Aug. 28, 1998, now Pat. No. 6,341,303, and a continuation-in-part of application No. 09/141,666, filed on Aug. 28, 1998, now Pat. No. 6,457,008.

(51) Int. Cl.
*G06F 9/46* (2006.01)
*G06F 15/173* (2006.01)
*G06F 15/16* (2006.01)

(52) U.S. Cl. .................. 718/104; 709/225; 709/226; 709/229

(58) Field of Classification Search .......... 718/103, 718/104; 714/7; 709/225–229; 707/1, 8–10; 710/36; 705/8–9; 713/100
See application file for complete search history.

(56) References Cited

U.S. PATENT DOCUMENTS

| | | | |
|---|---|---|---|
| 3,865,999 A * | 2/1975 | Spitaels | ............... 379/2 |
| 4,283,771 A | 8/1981 | Chang | |
| 5,010,482 A | 4/1991 | Keller et al. | |
| 5,325,525 A | 6/1994 | Shan et al. | |
| 5,355,475 A | 10/1994 | Tanaka et al. | |
| 5,392,430 A | 2/1995 | Chen et al. | |
| 5,452,452 A | 9/1995 | Gaetner et al. | |
| 5,515,538 A | 5/1996 | Kleiman | |
| 5,566,349 A | 10/1996 | Trout | |
| 5,623,647 A | 4/1997 | Maitra | |
| 5,815,689 A | 9/1998 | Shaw et al. | |
| 5,828,568 A | 10/1998 | Sunakawa et al. | |
| 5,842,226 A | 11/1998 | Barton et al. | |
| 5,884,077 A | 3/1999 | Suzuki | |
| 6,003,061 A * | 12/1999 | Jones et al. | ............... 718/104 |
| 6,021,508 A | 2/2000 | Schmuck et al. | |
| 6,085,216 A | 7/2000 | Huberman et al. | |
| 6,085,218 A | 7/2000 | Carmon | |
| 6,085,333 A * | 7/2000 | DeKoning et al. | ............ 714/7 |

(Continued)

OTHER PUBLICATIONS

Logan G. Harbaugh, *Balancing The Load,* TechWeb, Jan. 25, 1999, pp. 1-14 http://www.internetweek.com/reviews/rev012599.htm.

(Continued)

*Primary Examiner*—Meng-Ai An
*Assistant Examiner*—Qing-Yuan Wu
(74) *Attorney, Agent, or Firm*—Vista IP Law Group LLP

(57) ABSTRACT

A computer system is selectively quiesced by preventing selected resource consumers from starting new activity on a computer system, while allowing already-running activity to continue. Resource consumers are divided into resource consumer groups, and some groups are prevented from starting new activity while other groups are allowed to start new activity. A scheduler is used to alternate between resource plans, including a quiescence plan and an operations plan.

29 Claims, 11 Drawing Sheets

800

| | Group | Session Limits |
|---|---|---|
| 302 | OLTP | session limit = 0<br>timeout = 60,000 |
| 304 | BATCH | session limit = 0<br>timeout = 60,000 |
| 810 | MAINTENANCE | <none> |

U.S. PATENT DOCUMENTS

| | | | |
|---|---|---|---|
| 6,105,053 A | 8/2000 | Kimmel et al. | |
| 6,160,798 A | 12/2000 | Reed et al. | |
| 6,182,133 B1 | 1/2001 | Horvitz | |
| 6,223,201 B1 | 4/2001 | Reznak | |
| 6,226,745 B1 * | 5/2001 | Wiederhold | 726/1 |
| 6,263,298 B1 | 7/2001 | Kerman et al. | |
| 6,263,358 B1 | 7/2001 | Lee et al. | |
| 6,263,359 B1 * | 7/2001 | Fong et al. | 718/103 |
| 6,341,303 B1 | 1/2002 | Rhee et al. | |
| 6,353,844 B1 | 3/2002 | Bitar et al. | |
| 6,366,915 B1 | 4/2002 | Rubert et al. | |
| 6,366,945 B1 | 4/2002 | Fong et al. | |
| 6,385,637 B1 | 5/2002 | Peters et al. | |
| 6,385,638 B1 | 5/2002 | Baker-Harvey | |
| 6,412,007 B1 * | 6/2002 | Bui et al. | 709/227 |
| 6,415,190 B1 | 7/2002 | Colas et al. | |
| 6,415,384 B1 | 7/2002 | Dave | |
| 6,430,594 B1 | 8/2002 | Akiyama et al. | |
| 6,430,619 B1 * | 8/2002 | Sitaraman et al. | 709/225 |
| 6,438,704 B1 * | 8/2002 | Harris et al. | 713/502 |
| 6,442,608 B1 * | 8/2002 | Knight et al. | 709/225 |
| 6,463,457 B1 | 10/2002 | Armentrout et al. | |
| 6,496,848 B1 | 12/2002 | Nankaku | |
| 6,529,955 B1 * | 3/2003 | Sitaraman et al. | 709/225 |
| 6,550,042 B1 | 4/2003 | Dave | |
| 6,563,793 B1 | 5/2003 | Golden et al. | |
| 6,581,055 B1 | 6/2003 | Ziauddin et al. | |
| 6,600,963 B1 | 7/2003 | Loise et al. | |
| 6,601,035 B1 | 7/2003 | Panagos et al. | |
| 6,643,367 B1 | 11/2003 | White-Hauser | |
| 6,667,988 B1 | 12/2003 | Liu et al. | |
| 6,714,960 B1 | 3/2004 | Bitar et al. | |
| 6,718,332 B1 * | 4/2004 | Sitaraman et al. | 707/102 |
| 6,728,959 B1 | 4/2004 | Merkey | |
| 6,779,182 B1 | 8/2004 | Zolnowsky | |
| 6,792,445 B1 | 9/2004 | Jones et al. | |
| 7,017,156 B1 | 3/2006 | Rhee et al. | |
| 7,020,878 B1 | 3/2006 | Rhee et al. | |
| 2002/0019879 A1 | 2/2002 | Jasen et al. | |
| 2003/0021228 A1 | 1/2003 | Nakano et al. | |
| 2003/0028852 A1 | 2/2003 | Thurman et al. | |
| 2003/0120871 A1 | 6/2003 | Ayaki et al. | |
| 2003/0200252 A1 | 10/2003 | Krum | |
| 2004/0039935 A1 | 2/2004 | Pisecky | |
| 2004/0073603 A1 | 4/2004 | Ellis, III | |
| 2004/0073735 A1 | 4/2004 | Boom et al. | |

OTHER PUBLICATIONS

Sitara Networks; QoS Glossory, Jul. 2, 2001, pp. 1-18, http://www.sitaranetworks.com/what_is_qos_glossary.cfm.

Zhang, Y. et al. "An Integrated Approach to Parallel Scheduling Using Gang-Scheduling, Backfilling, and Migration" Job Scheduling Strategies for Parallel Processing: 7th International Workshop, JSSPP 2001 Cambridge MA, D.G. Feitelson and L. Rudolph (eds.), Jun. 16, 2001, pp. 133-158, Springer-Verlag Berlin, Heidelberg.

* cited by examiner

|  | LEVEL 1 552 | LEVEL 2 554 | LEVEL 3 556 |
|---|---|---|---|
| ON-LINE CONSUMERS 560 | 60% | 50% | 0% |
| BATCH CONSUMERS 562 | 20% | 0% | 100% |
| DBMS MAINTENANCE 564 | 0% | 50% | 0% |

DATABASE PLAN 550

| | Group | Session Limits |
|---|---|---|
| 302 | OLTP | session limit = 0<br>timeout = 60,000 |
| 304 | BATCH | session limit = 0<br>timeout = 60,000 |
| 810 | MAINTENANCE | <none> |

FIG. 8

METHODS FOR SELECTIVELY QUIESCING A COMPUTER SYSTEM

RELATED APPLICATION INFORMATION

This application is a continuation-in-part of U.S. patent application Ser. No. 09/141,664 filed Aug. 28, 1998, now U.S. Pat. No. 6,341,303, the application of which is incorporated herein by reference in its entirety, and a continuation-in-part of U.S. patent application Ser. No. 09/141,666 filed Aug. 28, 1998, now U.S. Pat. No. 6,457,008, the application of which is incorporated herein by reference in its entirety.

BACKGROUND

1. Field of the Invention

The present invention relates to computer operating systems. More specifically, the invention relates to a method of scheduling the use of a computer system resource according to a non-preemptive and dynamically selectable allocation scheme, and selectively quiescing activity from users of the computer system resource.

2. Related Art

Multi-user computer systems are becoming ever more popular. These systems allow hundreds or even thousands of users to share access to a computer system, such as a database system. These computer systems are large and complex, and process much critical data. Service interruptions in such computer systems are costly, and thus it is beneficial to minimize the length and impact of such interruptions on users wherever possible.

These users are each executing processes, running queries, and otherwise accessing the computer system. From time to time, it is necessary to de-activate part or all of the computer system. For example, if a database stored on the computer system becomes damaged, or if a disk drive or logic board in the computer system needs to be replaced, then user access to part or all of the system needs to be temporarily denied, while the needed maintenance is done.

In a traditional computer system, when the system is brought down it is a major disruption to the users. For example, broadcast messages are typically sent to all users, instructing them to log off of the system at a certain time. Frequently, users are also required to terminate any running processes. If a user is in the middle of a session and does not receive the message to log off, the user risks having work in progress interrupted, with a possible loss of data or other negative consequences. When the announced time comes, all user activity is terminated, the system is shut down to all user activity, and the maintenance is performed. Then the computer system is brought back up, and the users are allowed to log back in.

These procedures are very disruptive to the users of the computer system. Because of this, maintenance is often postponed or delayed until a time when the computer system is less busy. However, delaying needed maintenance is itself inefficient, as the computer system's operations suffer while the needed maintenance is delayed. Thus, methods are needed to allow access to a computer system to be shut off with minimal disruption of user activity.

SUMMARY

In an aspect of an embodiment of the invention, a first resource consumer is prevented from starting up new activity, while a second resource consumer is allowed to continue already-running activity unhindered.

In another aspect of an embodiment of the invention, a first group of resource consumers is prevented from starting up new activity on the computer system, while a second group of resource consumers is allowed to start up new activity on the computer system.

In another aspect of an embodiment of the invention, a resource consumer is prevented from initiating new activity by having a configurable session limit value applicable to that resource consumer set to zero.

In another aspect of an embodiment of the invention, a computer system is quiesced by activating a resource plan that contains quiescence values for one or more groups of resource consumers.

In another aspect of an embodiment of the invention, new activity which is prevented from being initiated is queued.

DESCRIPTION OF THE FIGURES

FIGS. 4A-4C depict a resource plan, including a maximum active sessions resource allocation method, having a sub-plan in one embodiment of the invention.

FIG. 8 is a diagram of a quiescence plan according to an embodiment of the invention.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. For example, the present invention is described predominantly in terms of a database management system including a scheduler for scheduling or allocating a computer system's resources among a plurality of requesting entities. However, the concepts discussed herein are broad enough to provide for the allocation of any computer system resource among a plurality of entities needing the resource, within or without a particular application environment.

Throughout this detailed description, numerous specific details are set forth. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In some instances, components implemented by the present invention are described at an architectural, functional level. Many of the elements may be configured using well-known structures. Additionally, for logic to be included within the system of the present invention, functionality and flow diagrams are described in such a manner that those of ordinary skill in the art will be able to implement the particular methods without undue experimentation. It should also be understood that the techniques of the present invention can be implemented using a variety of technologies. For example, the resource scheduler described herein may be implemented in software running on a computer system, or implemented in hardware utilizing either a combination of microprocessors or other specially designed application specific integrated circuits, programmable logic devices, or various combinations thereof.

Sharing Resources in a Database Management System Environment

In one embodiment of the invention, a database management system (DBMS) is provided for operation on a database server. The DBMS includes a scheduler for allocating computer resources among the various users, processes and jobs interacting with the DBMS environment.

Figure 1:
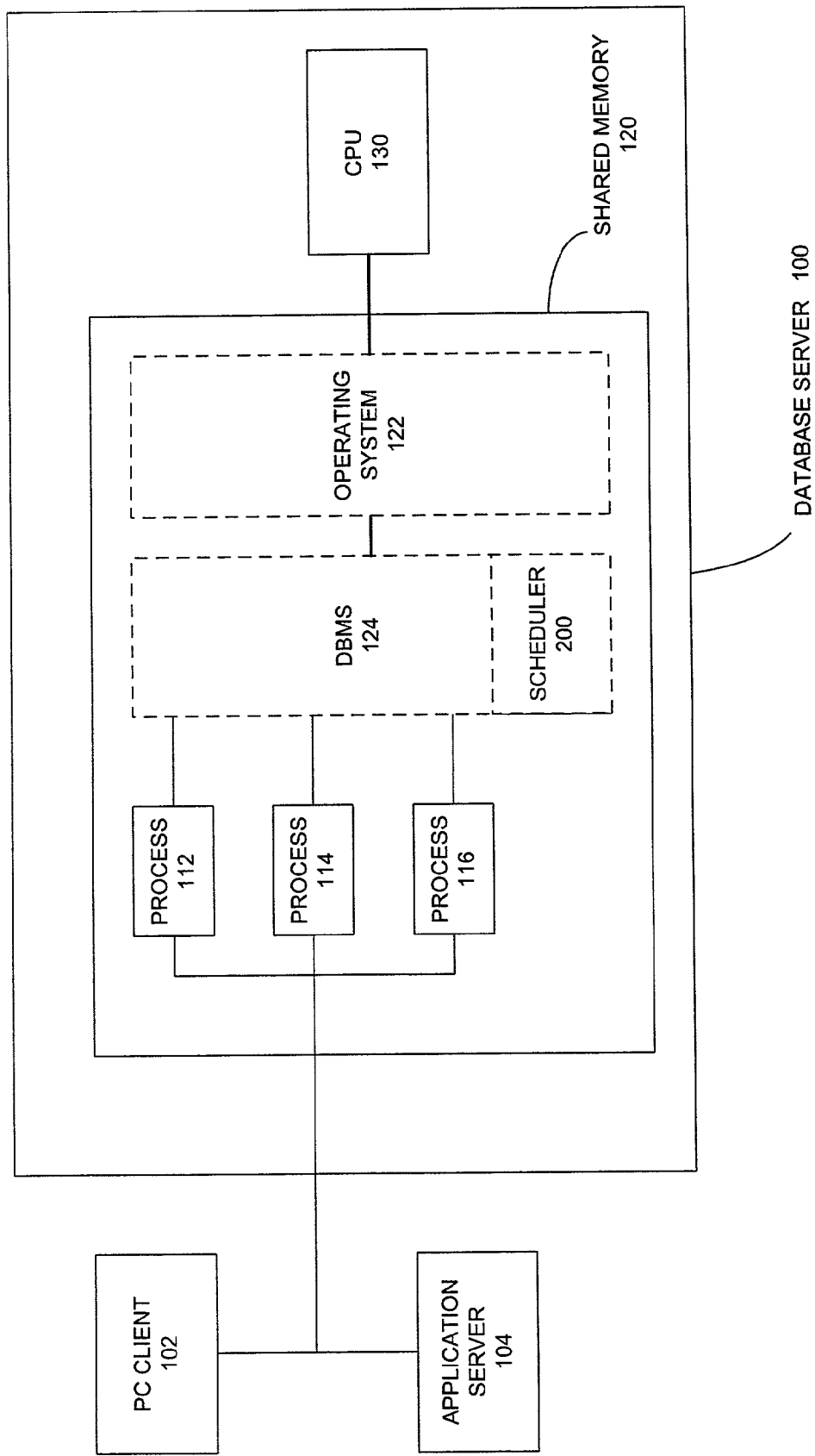
FIG. 1 illustrates a database server on which one embodiment of the invention may be practiced.

FIG. 1 depicts an illustrative database management system operating on database server 100. DBMS software 124 and operating system 122 are resident in shared memory 120, where they are executed by processor (or CPU) 130. DBMS software 124 includes scheduler 200. In an alternative embodiment, scheduler 200 is separate from DBMS software 124.

In the illustrated embodiment, the DBMS serves one or more clients. Illustratively, client 102 is a small computer system, such as a microcomputer, and client 104 is an application server offering the DBMS services of database server 100 to multiple end users. DBMS processes also reside in memory 120 and operate on behalf of end users, clients, a database administrator (DBA), or another process. Three database processes 112, 114 and 116 are illustrated in FIG. 1. One skilled in the art will recognize that server 100 can be configured to operate a wide range of processes numbering from a few into the thousands and that the scope of the invention is not limited by the number or type of processes executed on server 100.

Database processes executing on server 100 share memory 120, which is coupled to processor 130. In an alternative embodiment, server 100 employs multiple processors. In order to maximize the use of processor 130, one or more DBMS processes that are ready to execute (i.e. are "runnable") are illustratively placed in a run queue (not shown in FIG. 1) within memory 120. When an executing process completes execution or otherwise relinquishes control of the processor, a process within the run queue takes over.

In a present embodiment of the invention, DBMS software 124 is Oracle® RDBMS 9i by the Oracle Corporation of Redwood Shores, Calif. and operating system 122 is Solaris, by Sun Microsystems, Inc. of Palo Alto, Calif. DBMS software 124 illustratively includes a portion of operating system-dependent code to interface between operating system 122 and DBMS software 124. In such an embodiment, the majority of the instructions included in DBMS software 124 are identical regardless of the brand or version of operating system 122. The operating system-dependent code, however, is tailored to the specific operating system (e.g., Solaris, Unix, Windows NT).

Operating system 122 manages the database server's resources (e.g., disk space, memory, network bandwidth, and processor 130) at a low level, sharing them among all requesting entities. However, a primary function of database server 100 in the present embodiment is to operate DBMS software 124 and serve the DBMS' clients and users. Therefore, the DBMS environment consumes the vast majority of the server's resources. Thus, although the operating system manages system resources at a low level, most of the system resources are used within the DBMS where they are partitioned among groups of consuming entities by scheduler 200 as described below.

Scheduler 200 is highly flexible and employs an allocation, or scheduling, plan that is dynamically selectable. Multiple resource plans may be configured and stored on the server, and one or more plans may be active at a time. The active plans may be exchanged for other plans during the operation of the DBMS and server. A resource plan partitions system resources among groups of consumers assembled by a DBA or system manager. Resource consumer groups and resource plans are further described below, following the description of an illustrative scheduler.

Description of a Database Scheduler

Figure 2:
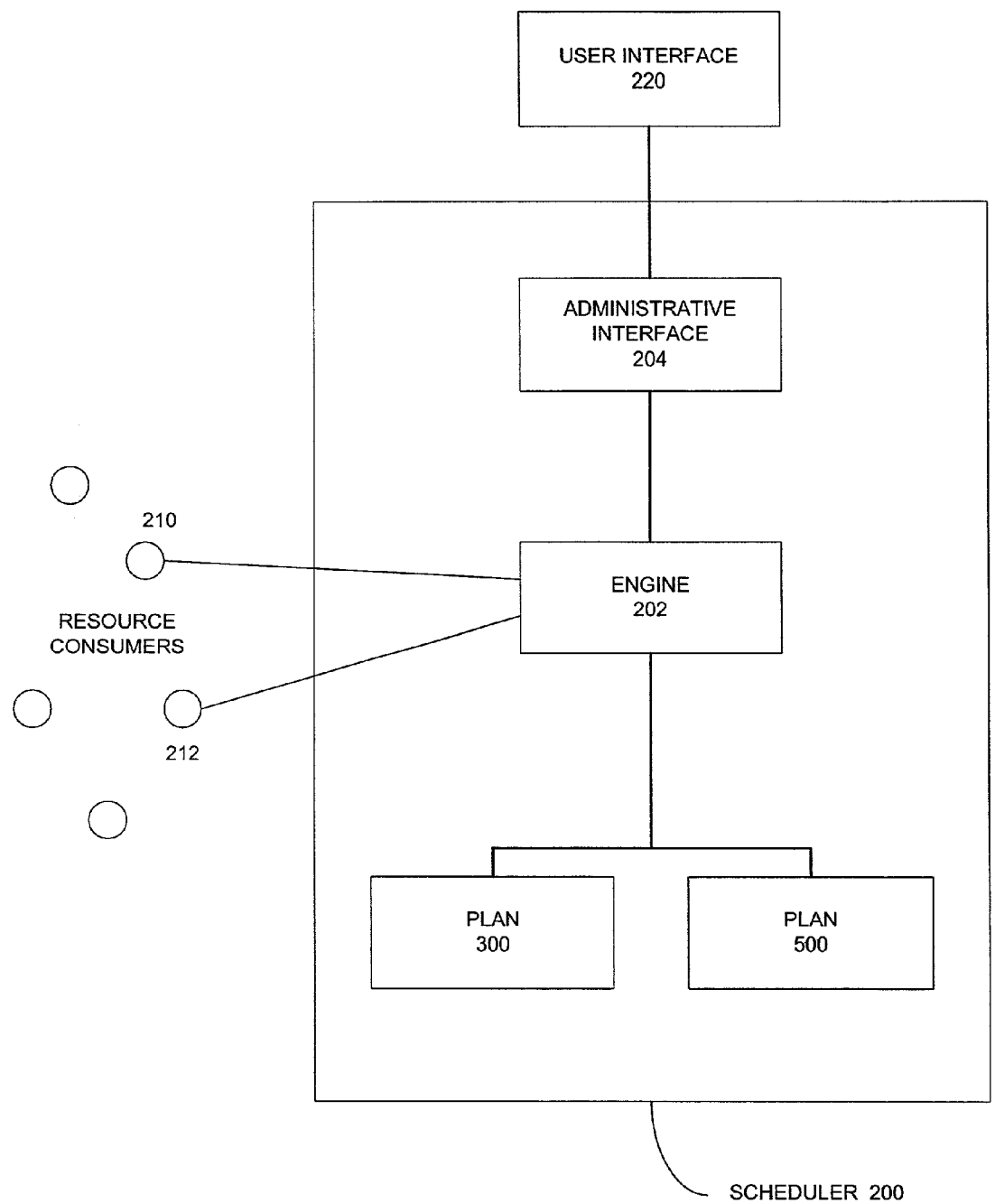
FIG. 2 is a block diagram illustrating a resource scheduler according to one embodiment of the invention.

With reference now to FIG. 2, scheduler 200 is depicted according to one embodiment of the invention. In the illustrated embodiment, the scheduler comprises a portion of DBMS software 124 (from FIG. 1) other than operating system-dependent code. The scheduler 200 is a piece of software that can be executed by any or all running processes on the DBMS. For example, a DBMS process will periodically call into the scheduler 200 to determine whether the process should keep running. If not, the scheduler 200 will chose another process to run.

In this embodiment, scheduler 200 allocates system resources among various entities, herein termed "resource consumers." Resource consumers illustratively include processes and jobs (such as processes 112, 114 and 116 from FIG. 1) needing system resources to execute on behalf of DBMS clients and users. Resource consumers are grouped into "resource consumer groups." In one variation, a database administrator or system manager assigns a resource consumer to a resource consumer group. Scheduler 200 allocates system resources according to a "resource plan", which is a scheme for allocating a resource among a plurality of resource consumer groups and/or sub-plans in accordance with a resource allocation method. A resource plans can contain one or more "resource allocation methods" which are strategies for allocating a resource, and/or one or more "sub-plans", which are schemes for allocating a resource among a plurality of resource consumer groups in accordance with a resource allocation method.

Scheduler 200 includes engine 202, administrative interface 204, and one or more resource plans. Two resource plans 300, 500 are depicted in FIG. 2, although one skilled in the art will recognize that the number of plans configured and stored within scheduler 200 does not limit the scope of the present invention. In an embodiment, only one of plans 300, 500 at a time is implemented (i.e., "active") by scheduler 200 during the operation of the DBMS. A DBA may, however, exchange the active plan for a different one even during operation of the DBMS. In an alternate embodiment, multiple plans are active at the same time.

Administrative interface 204 is coupled to user interface 220, which is external to scheduler 200. User interface 220 and administrative interface 204 are employed by a DBA to configure scheduler 200. Through these interfaces, the DBA can configure (e.g., create, modify and delete) a group of resource consumers or select a resource plan for implementation by scheduler 200. The DBA can also modify resource plans, such as to change the groups within a plan or alter a plan's resource allocation method (described below) for allocating system resources.

In a present embodiment, the DBA also employs user interface 220 and administrative interface 204 to observe the performance of scheduler 200. Illustratively, parameters are stored by scheduler 200 concerning its operation, such as statistics reflecting the actual allocation of system resources, the number of entities requesting system resources, the amount of time that consumers or resource consumer groups must wait to receive system resources, etc.

Resource consumers communicate with scheduler 200 in order to request and receive system resources. Two resource consumers 210, 212 are illustrated in FIG. 2. Illustratively, scheduler 200 keeps a count of the number of consumers that are "runnable," or ready to execute. In accordance with the active resource plan, engine 202 determines which resource consumer group and/or individual consumer is to receive system resources as they become available.

The active plan or plans (i.e., the plan or plans implemented by scheduler 200) can be changed during the operation of the DBMS. In other words, engine 202 can quickly switch from implementing plan 300 to implementing plan 500 without interrupting the operation of the DBMS or server 100. Plans are installed at the time the DBMS is initialized and can be removed, modified and added as necessary. As described below, a plan allocates system resources among groups of resource consumers according to an associated resource allocation method and numerical values associated with each group. One plan may be well suited to efficiently meet the needs of certain types of consumers at certain times (e.g., during the business day when most of the consumers comprise processes representing on-line, interactive, users). A different plan, possibly comprising the same groups but having a different resource allocation method or different numerical values attached to the groups, may be more effective than the first at a different time (e.g., at nighttime, when most of the consumers are batch processes).

Resource Plans

Figure 3:
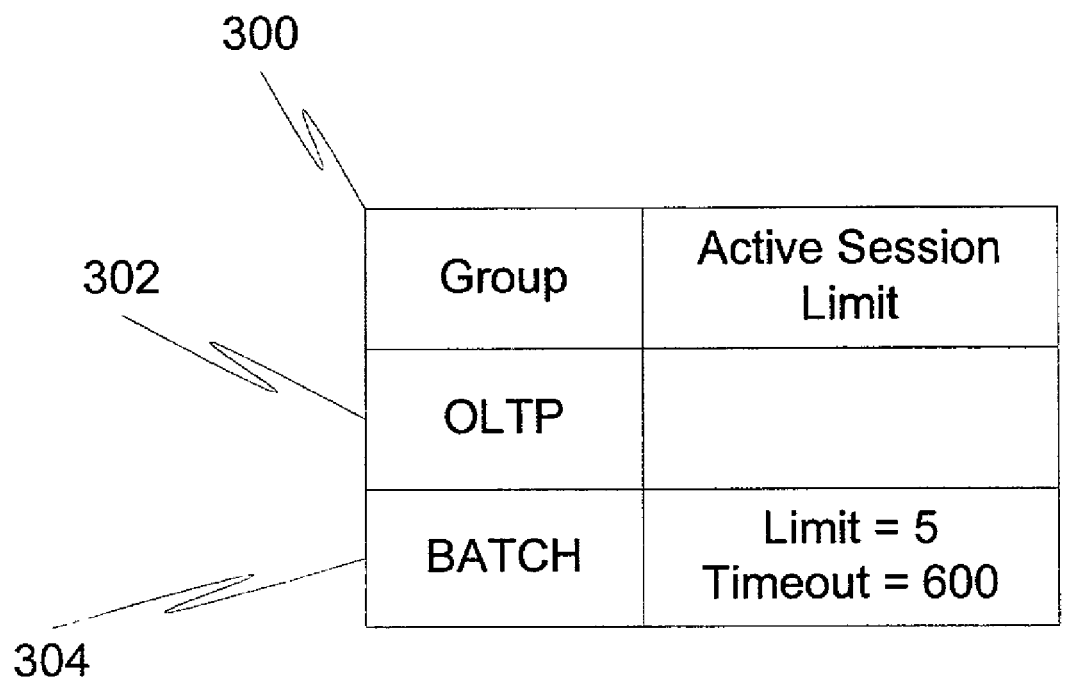
FIG. 3 depicts a resource plan, including a maximum active sessions resource allocation method, for scheduling resources according to one embodiment of the invention.

The following is a description of an illustrative resource plan depicted in FIG. 3. It will be understood that a wide variety of resource plans may be configured in accordance with the present invention. In general, however, a DBA first assembles resource consumers into groups. Illustratively, group assignments are made based upon the consumers' requirements for system resources (e.g., batch vs. on-line users, administrative and maintenance functions vs. data processing). The DBA then assembles one or more groups into a plan. Within a plan, system resources are allocated to groups of consumers according to numerical values associated with each group in the plan. Multiple plans can include the same groups with different numerical values. In addition, a plan may be included in another plan as a sub-plan. In an embodiment, the numerical values are statically computed ahead of time and included in the resource plan. In another embodiment, the numerical values are dynamically calculated while the DBMS is operating. For example, the DBMS of an embodiment measures various system load parameters and dynamically adjusts the numerical values in response to changing system load characteristics.

Within each plan, the DBA specifies an inter-group resource allocation method for partitioning system resources between the groups included in the plan. When a plan is to be implemented by scheduler 200, each group receives system resources according to its associated numerical value and the specified resource allocation method. An intra-group resource allocation method may also be specified for allocating system resources within a group. One advantageous resource allocation method, termed a "maximum active sessions" resource allocation method, is described immediately below. Other methods are possible, such as emphasis, round-robin, strict preemption, priority, etc.

In a present embodiment of the invention plan 300 is a "maximum active sessions" plan. In other words, plan 300 allocates system resources between groups of resource consumers according to a "maximum active sessions" resource allocation method. Specifically, a maximum active sessions plan or resource allocation method divides system resources among groups by establishing limits on the number of sessions that can be active within any given group. When the maximum active sessions resource allocation method is used for inter-group allocation, different groups of resource consumers are given different (or possibly equal) maximum active session limits. Intra-group allocation may use a variety of methods, such as emphasis, round-robin, priority, etc. Thus, in a maximum active sessions plan, individual resource consumers and/or groups of resource consumers are assigned maximum active session values. These values cause the system resources to be partitioned, with groups having higher limits getting more access to resources than groups having lower limits, because the groups with higher limits will be allowed to have more active sessions. This also guarantees that each group will have access to a minimal level of resources.

With reference to FIG. 3, ERP plan 300 is depicted. ERP plan 300 has two groups, on-line transaction processing (OLTP) group 302 and batch (BATCH) group 304. OLTP group 302 does not have a maximum active sessions limit defined for it. Therefore, OLTP group 302 has no plan-imposed limits on the number of concurrently active sessions allowed. It is possible, however, that the DBMS or the underlying operating system may impose some form of limits on the total number of active sessions allowed for the entire DBMS or operating system. Batch group 304 has a maximum active sessions limit of five. Thus there can be no more than five concurrently active sessions within the batch group 304.

An "active session" is defined as a session that is currently part of an active computer system operation, such as a database transaction or query. Once the maximum active sessions limit is reached, all subsequent sessions attempting to become active are queued until other active sessions complete or otherwise become inactive. Once an active session starts running, the scheduler will allow the operation (transaction, query, etc) to complete.

The queuing decision can be addressed in several different ways. When a session becomes active, a slot is allocated for that session. It is possible that a session's unit of work is composed of several statements forming a transaction, or multiple cursors forming a single query operation. Each individual subcomponent of work is represented by a new top call, or process. Not all of these statements or cursors will necessarily be processed at the same time. Thus, it possible that a session could be queued between subcomponents, as one subcomponent finished executing, and another was about to start up. This presents a danger of deadlock, as a second session needs resources being held by a queued process.

In an embodiment, a "large granule pessimistic" queuing strategy is adopted. An active session is charged against the maximum active sessions limit for only the first top call generated for a unit of work (transaction, query, etc.), and a slot is allocated for this session at the beginning and for the entire duration of the operation. This slot is only freed when the unit of work has completed, e.g. when a transaction is committed or when a query has freed all the meta-resources, cursors, locks, memory, etc. that is may be holding. This avoids the deadlock problem because a session would not get queued while holding shared resources since, if it holds shared resources, it is already occupying a slot and is therefore runnable, and runnable sessions do not get queued. Where a parallel operation is performed, the entire parallel operation is counted as one active session, even though the operation may result in many slave sessions being created for the parallel processors.

In an alternate embodiment, a "small granule pessimistic" queuing strategy is used. A slot is allocated every time a subcomponent of work starts, and a slot is freed every time a subcomponent of work is completed. In order to avoid deadlocks, any sessions that hold shared resources are always allowed to run, even if this results in the active sessions limit being exceeded.

In yet another alternate embodiment, a "small granule optimistic" queuing strategy is used. This strategy is similar to the small granule pessimistic strategy discussed above, with a deadlock detection mechanism added in. This detection mechanism detects queued sessions that are blocking currently running sessions, and submits those queued sessions to be run. This strategy avoids deadlocks, yet keeps a tighter limit on the number of running sessions.

Various different queuing methods are also within the scope of an embodiment of the invention. For example, a first-in first-out (FIFO) queue can be used, where the first session at the head of the queue is run before any session queued behind it. Alternatively a shortest estimated execution time queue can be used, where the session estimated to take the least amount of time to run will be executed before longer sessions.

In an embodiment, a timeout value is specified as part of the resource plan. The timeout value indicates how long any session will wait on the queue. If a session waits on the resource consumer group's queue for longer than the specified timeout, the session will abort with an error. For example, the batch group 304 in the ERP plan 300 includes a timeout value of 600 seconds (10 minutes). Thus any batch session which is waiting in the queue for 10 minutes or longer will be aborted with an error.

The ERP plan 300 has been depicted using an absolute number value to define the maximum active session limit. Other embodiments of the invention use other resource allocation methods to define the maximum active session limit. For example, in an alternate embodiment a percentage of a total active sessions limit for the entire resource plan or for the computer system is used, instead of an absolute number. In another alternate embodiment, a dynamically computed value, based on system load measurements or other criteria, is used to define the maximum active session limit for a resource consumer group.

Figure 4A:
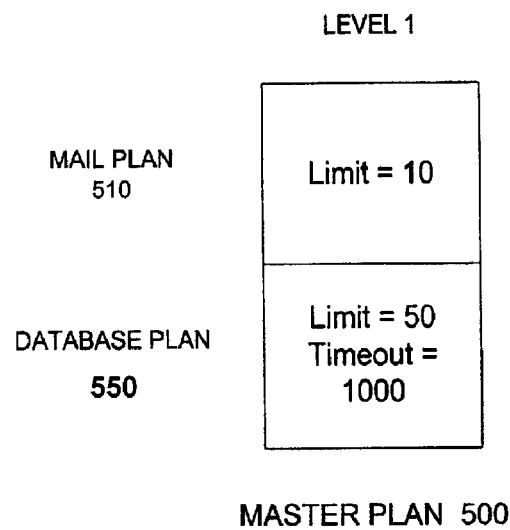
Figure 4B:
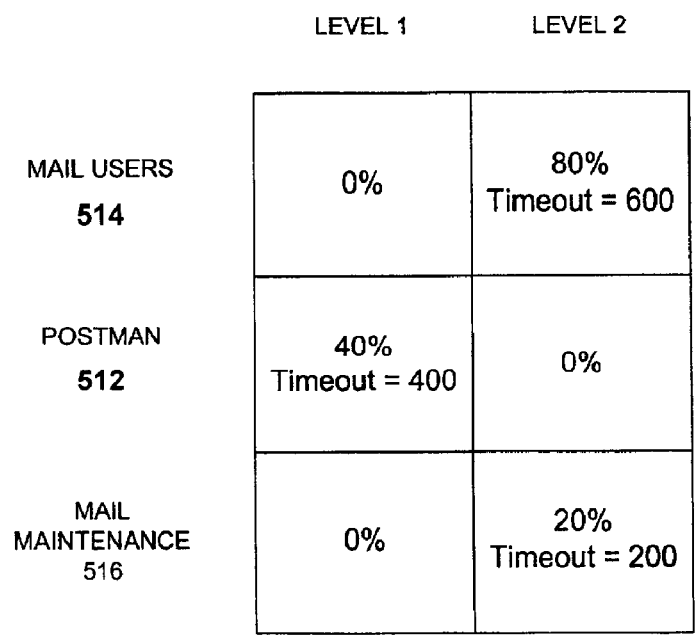

In another embodiment, the resource plan has multiple levels. FIGS. 4A, 4B and 4C depict a plan having two sub-plans, each of which are emphasis plans. In FIG. 4A, MASTER plan 500 is a resource plan in which all resources are divided among the two sub-plans: MAIL plan 510 and DATABASE plan 550. The MAIL plan 510 has a maximum active sessions limit of 10. The DATABASE plan 550 has a maximum active sessions limit of 50.

MAIL plan 510, depicted in FIG. 4B, consists of 2 levels. In Level 1, the Postman group of resource consumers (represented by the numeral 512) is allocated 40% of the maximum active session limit for the MAIL plan 510 while the mail users and mail maintenance groups (represented by the numerals 514 and 516) share the remaining 60% by a ratio of 80 to 20 in Level 2. DATABASE plan 550 is depicted in FIG. 4C.

With reference now to FIG. 4C, DATABASE plan 550 is depicted. DATABASE plan 550 consists of three levels (Level 1, Level 2 and Level 3), represented by the numerals 552, 554 and 556. On-line (or interactive), batch and DBMS maintenance groups are represented by the numerals 560, 562 and 564.

Within DATABASE plan 550, all active session slots available to the DATABASE plan 550 are first allocated in Level 1 according to the percentages associated with each group included in the level. Thus, online and batch consumers receive 60% and 20%, respectively, of the available active session slots. The active session slots not allocated in Level 1 (i.e., 20% of all available slots) are allocated among the groups participating in Level 2 according to their assigned percentages. Thus, online and DBMS maintenance tasks each get 50% of the remaining 20% of the active session slots (i.e., each gets 10% of the total slots). Finally, if active session slots are somehow unallocated after Level 2, they are all allocated to the batch group in Level 3. For example, if a group participating in Level 1 or Level 2 is empty at the time scheduler 200 would have allocated active session slots to the empty group, the active session slots that would have been allocated to the empty group are given to the batch group in Level 3.

As plan 500 demonstrates, several levels may be configured in a plan. If, after the last level, active session slots remain unallocated, they are recursively allocated according to the active plan. Additionally, plan 500 demonstrates that different resource allocation methods can be combined within a plan.

Figure 5:
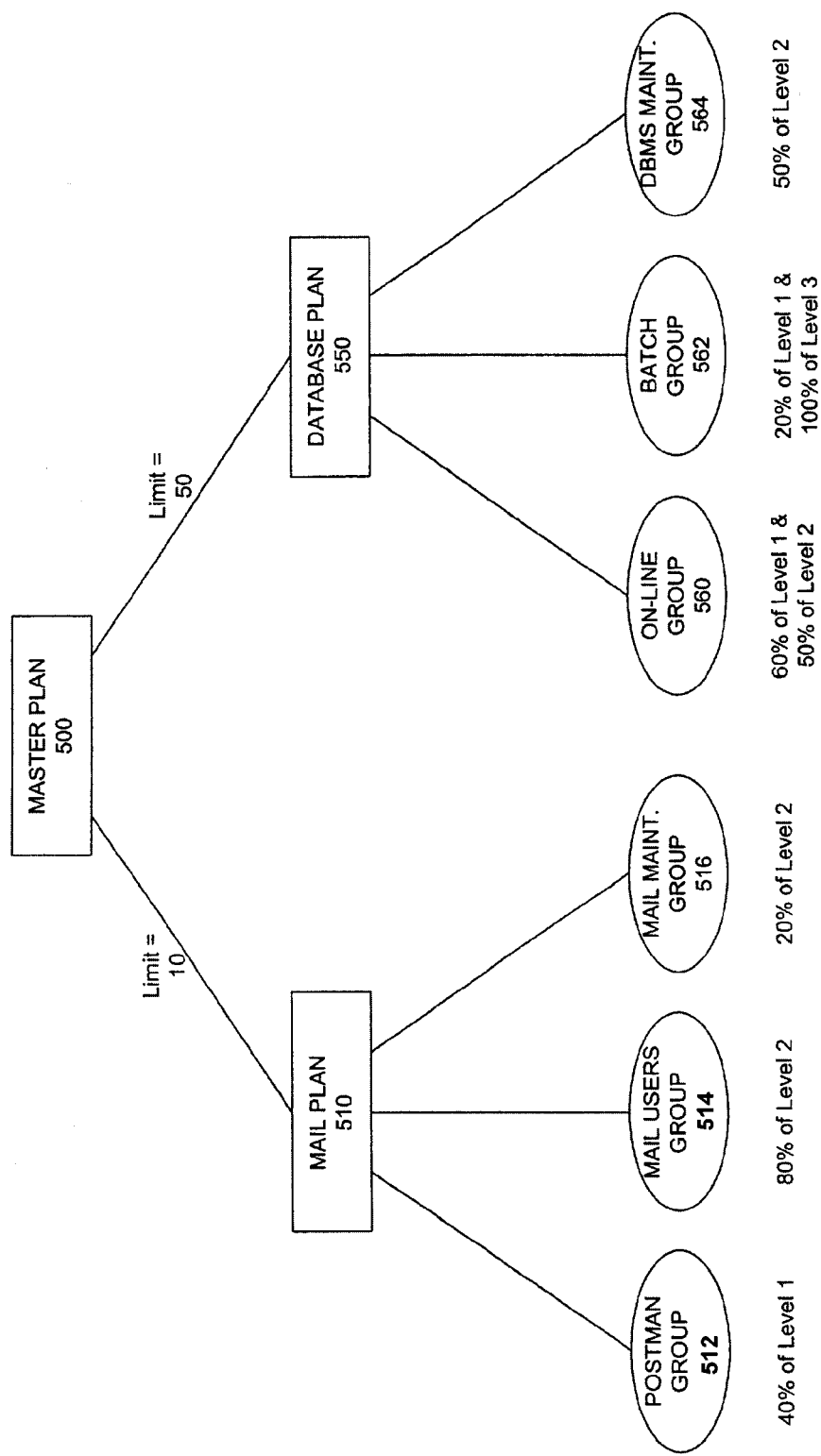
FIG. 5 is a diagram demonstrating the partition of system resources according to the plans of FIGS. 4A-4C according to an embodiment of the invention.

FIG. 5 is a tree-structured diagram demonstrating the division of active session slots according to MASTER plan 500. During the operation of the DBMS, scheduler 200 allocates active session slots to the various groups, 512, 514, 516, 560, 562, 564 according to their corresponding percentages.

Operation of a Scheduler

As stated above, scheduler 200 monitors the need for system resources by resource consumers. To ensure correct allocation of system resources among the consumers according to the chosen resource allocation method, scheduler 200 communicates with the consumers, tracks their status, and allocates system resources according to specified inter-group and intra-group resource allocation methods.

When a new consumer first requests system resources from scheduler 200, thus indicating it is ready to execute, a "virtual thread" is created and associated with the new consumer's group. Virtual threads thus indicate those consumers that are runnable, or waiting to execute.

Figure 6:
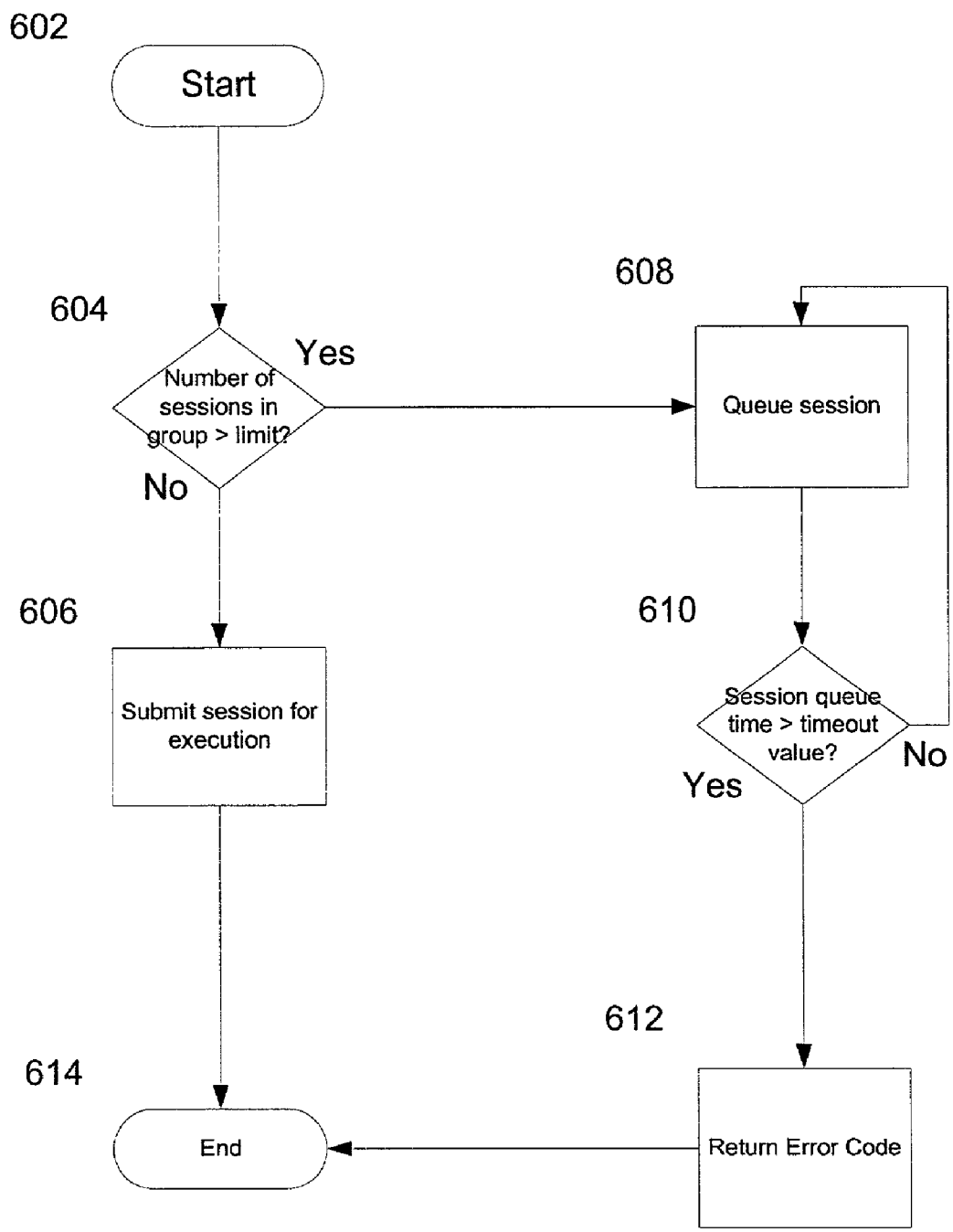
FIG. 6 is a flow chart illustrating a procedure in which resource consumers seeking to become active are managed by a resource scheduler, according to an embodiment of the invention.

Turning to FIG. 6, an illustrative method of allocating system resources using maximum active session limits is discussed. A resource consumer first requests system resources, at step 602. The scheduler receives the request and checks to see which group the resource consumer belongs to. Using the identified group, the scheduler looks up the maximum active session limit criteria associated with the group (e.g. the maximum active sessions limit value or percentage). The scheduler then compares the number of currently active sessions in the indicated group with the maximum active session limit criteria specified for the group, at step 604.

If the number of active sessions allowable for the indicated group has not yet been met, then the scheduler allows the resource consumer to be submitted for execution, at step 606. The method then terminates at step 614.

If the scheduler determines that the maximum number of allowable sessions are already active for the indicated group, then the scheduler queues the incoming resource consumer, at step 608. As sessions within the indicated group go inactive, the queued sessions will be activated according to the queuing methods discussed above.

Periodically, the scheduler polls the queued session, to see how long the session has been in the queue, at step 610. If the session has been in the queue for less than the timeout value, if any, specified for the indicated group, then the queued session remains in the queue. If the queued session has been in the queue for longer than the specified timeout value, then the queued session is aborted, and an error is generated, at step 612. The method then terminates at step 614.

In a present embodiment, resource consumers that are ready to execute are either executing or waiting to execute. Only one consumer at a time is executed by each processor in server 100. If waiting to execute (i.e., runnable), a consumer is either awake or asleep. A limited number of runnable consumers are kept awake, the rest are put to sleep.

When one consumers finishes executing, whether because it has completed its task or because it has used its allotted amount of processor time, or for any other reason, the next consumer to be executed is taken from the set of awake and runnable consumers. Sleeping consumers, however, cannot be executed until after they are awakened. In one embodiment of the invention, besides any consumers that are executing, only one runnable consumer at a time is kept awake. All others are put to sleep. Thus, in this embodiment, once the executing consumer relinquishes control of the processor, only one consumer is in line to execute and scheduler 200 is thus able to closely control the allocation of processor time among resource consumer groups and individual consumers.

In an alternative embodiment, a number of consumers are kept awake and runnable. Thus, less processor time is wasted in waking and putting consumers to sleep. Consumers are put to sleep if the number of runnable consumers that are awake is at or above a high threshold value (e.g., three times the number of processors in server 100). Sleeping consumers are awakened when the number of awake and runnable consumers drops below a low threshold (e.g., the number of processors in server 100).

When an executing consumer relinquishes control of processor 130, the operating system gives control of the processor, in accordance with its own allocation method, to a process that is awake and runnable. If there is only one consumer in such condition, then regardless of which allocation scheme the operating system uses (e.g., round-robin or priority), that consumer will be selected. With multiple processors, scheduler 200 illustratively maintains a separate list of runnable consumers for each processor, although use of a combined list is also within the scope of the invention.

During its execution by processor 130, each consumer periodically communicates with engine 202 to inquire whether it may retain control of the processor. In response, engine 202 either tells it to continue executing or commands the consumer to relinquish control of the processor and sleep. As long as the consumer is allowed to continue execute, it will retain control of the processor and periodically query engine 202.

When the consumer stops executing, operating system 122 gives control to a consumer that is awake and runnable. Thus, in order to maximize the use of each processor, it is preferable to keep at least one consumer awake and runnable for each processor. Therefore, in a present embodiment of the invention in which only one consumer is awake and runnable (but not executing) for each processor, when engine 202 commands the executing consumer to relinquish control of the processor, the engine passes the consumer the identity of a runnable, sleeping, consumer that is to be awakened. In other words, instead of the scheduler taking control of the processor just to awaken a sleeping consumer, the consumer that is giving up control of the processor awakens the new consumer before putting itself to sleep. One skilled in the art will recognize that this method of transfer minimizes the loss of usable processor time due to context switching.

Figure 7:
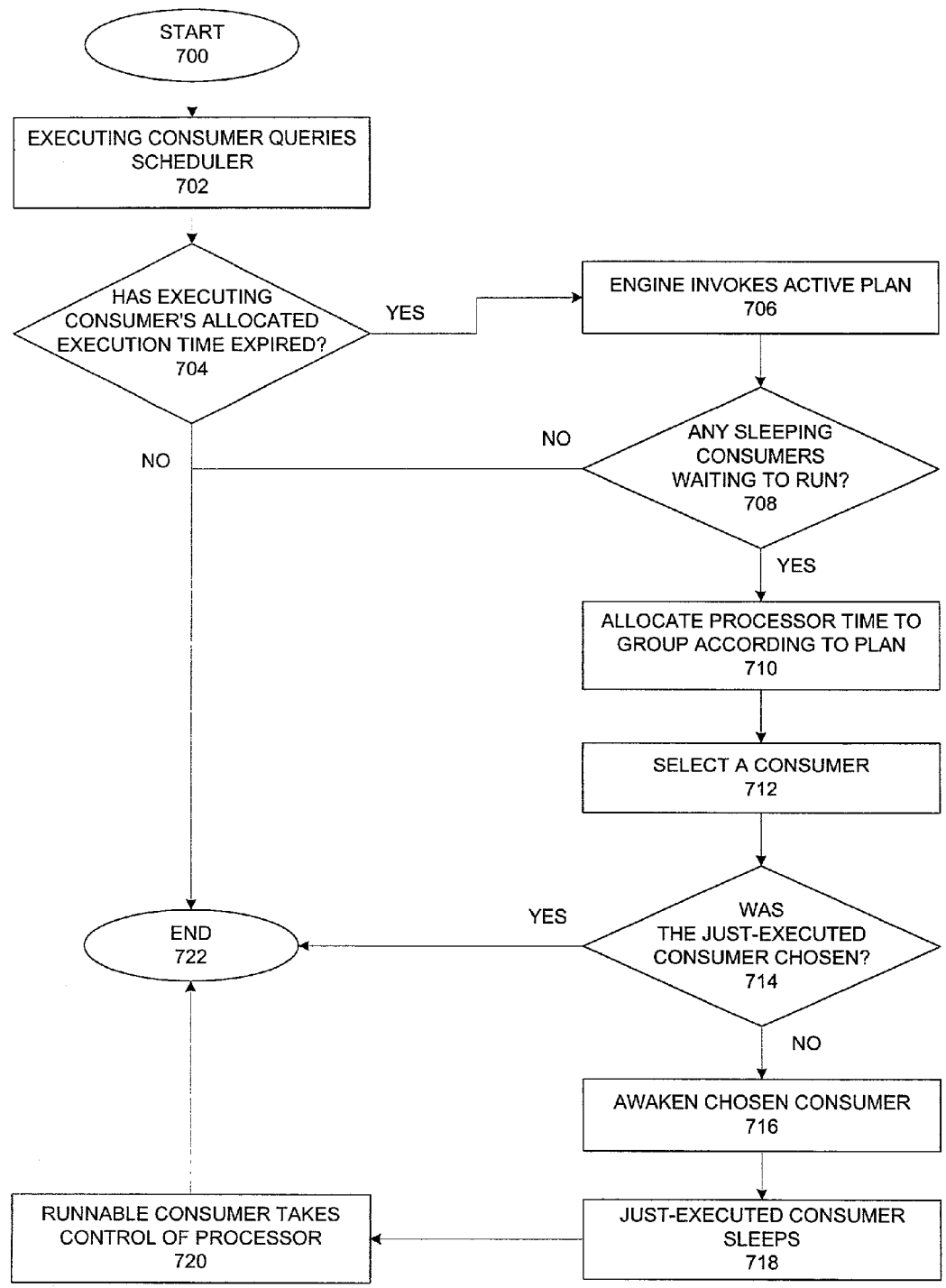
FIG. 7 is a flow chart illustrating a procedure in which resource consumers requiring processor time interact with a resource scheduler to execute in one embodiment of the invention.

FIG. 7 is a flow chart depicting an illustrative method of operating resource scheduler 200 in accordance with an embodiment of the invention. State 700 is a start state. In state 702, scheduler 200 receives a query from resource consumer 210, which is being executed by processor 130, wherein consumer 210 asks whether it should continue executing.

In state 704 the scheduler determines whether consumer 210 has utilized its allocated execution time (e.g., its assigned quanta). If not, consumer 210 continues executing and the illustrated method finishes with end state 722. If, however, consumer 210 has exhausted its allocated execution time, in state 706 the scheduler engine invokes the active plan (e.g., ERP plan 300 from FIG. 3) in order to determine which group of resource consumers should receive processor time.

In state 708 the scheduler determines whether there are any consumers ready or waiting to execute other than consumer 210. In order to make this determination, scheduler 200 maintains a list of virtual threads representing runnable consumers, as described above.

If there are fewer runnable consumers, including consumer 210, than there are processors, then no consumers are waiting for processor time and there is no need to stop executing consumer 210. In such a case, consumer 210 continues to execute and the system proceeds to state 722, an end state. The system also proceeds to state 722 from state 708 if there are no sleeping runnable consumers. This situation arises when there are relatively few consumers awaiting processor time (e.g., the number of awake and runnable consumers is within the allowable range described above).

If, however, a sleeping consumer must be awakened (e.g., the number of awake and runnable consumers has fallen below the low threshold described above), then scheduler 200 must allocate processor time among the groups of consumers that are waiting for processor time. The system thus proceeds to state 710.

In state 710, a group is chosen in accordance with the inter-group resource allocation method in effect for allocating processor time for ERP plan 300 (an example of a method of allocating processor time is described in co-pending U.S. patent application Ser. No. 09/141,666 filed Aug. 28, 1998, entitled "Resource Scheduler" and naming Ann Rhee, Sumanta K. Chatterjee, Juan R. Loaiza and Kesavan Srinivasan as inventors, which application is incorporated herein by reference, in its entirety). In addition, a specific consumer (e.g., consumer 212) is chosen according to the intra-group resource allocation method (e.g., round-robin) associated with the chosen group. In the presently described embodiment of the invention, a probabilistic function is applied to determine which group should receive processor time. In an alternative embodiment, a history is kept to track each consumer (and its group) that is executed in order to verify application of the active plan's specified percentages. For purposes of the illustrated embodiment, the chosen group (i.e., the group that includes consumer 212) is a different group from that which includes consumer 210 (the executing consumer). If the group including consumer 210 is chosen, scheduler 200 illustratively incorporates a bias toward minimizing context switches and thus tends to allow consumer 210 to continue executing and avoid the overhead involved in waking another consumer (unless such bias becomes too unfair to other consumers within the group).

In state 712, an individual consumer (e.g., consumer 212) is selected from within the chosen group and is identified to consumer 210 (the consumer that is to relinquish control of a processor).

In state 714 it is determined whether the selected consumer is the same consumer as that which is finishing execution (i.e., consumer 210). If so, consumer 210 receives an additional quantum and continues executing and the method ends with end state 722. As long as the selected consumer (e.g., consumer 212) is not the same as the one that finished its quanta, the method continues with state 716.

In state 716, consumer 210 awakens consumer 212. Consumer 210 then puts itself to sleep in state 718 to await its next opportunity to execute. In state 720 the operating system recognizes that processor 130 is idle and selects an executable process from those that are runnable. The system then proceeds to state 722, an end state.

Selecting an Active Plan or Policy

As stated above, multiple plans and resource allocation methods are stored on the database server in a present embodiment of the invention. The active plan (or plans) allocates system resources among resource consumer groups according to the method or methods (e.g., an inter-class method) active in the plan or plans. System resources may be allocated within a particular group according to the same or different method or methods (e.g., an intra-group method). In order to identify the active plan or plans and/or method or methods, a configuration module is illustratively maintained on the database server.

In one embodiment of the invention, separate allocation modules are installed on the database server for each combination of plans and methods that the DBA may choose to implement. The DBA may, for example, configure a first allocation module to include a first plan for dividing system resources among resource consumer groups according to an emphasis method specifying a first set of percentages. The DBA may configure a second allocation module reflecting a second plan in which system resources are partitioned among the same groups according to a second set of percentages or according to a round-robin method. Further, a third module having a third plan may be created to partition system resources among an entirely different set of groups, under the same or a different method than was used in the first and second plans. Although all three modules are installed on the database server, not all of them are necessarily active at the same time. The active plan or plans are identified in the configuration module.

Allocation modules therefore illustratively contain the attributes and features of a scheme (e.g., a plan, an inter-class method and an intra-class method) for allocating a system resource. The configuration module, however, contains one or more flags, fields or other identifiers indicating the allocation module or modules to be implemented by the scheduler. The DBA alters the configuration module as necessary during the operation of the DBMS to change the manner in which the scheduler allocates the resource.

In an alternative embodiment, the configuration module does not simply refer to one or more allocation modules to identify the entire scheme for allocating a resource. Instead, the configuration file refers to individual plans and methods, under the control of the DBA. In this alternative embodiment, one or more plans are installed on the database server, each including a different configuration of resource consumer groups, with values optionally assigned to each group. The configuration file identifies one or more such plans as active (perhaps having one or more sub-plans).

In embodiments of the invention in which a configuration module is employed, the configuration module may, at some time, fail to refer to any plans or methods currently installed on the system. In such an event, the resource is allocated according to a scheme used by the operating system executing on the server (e.g., round-robin, priority).

Quiescing a Computer System

In an embodiment, it becomes desirable, for various reasons, for a computer system, such as the database server 100 of FIG. 1, to be quiesced. For example, the database server hardware may need to be maintained or replaced, an element of the DBMS 124 may need to be updated or repaired, or an emergency process may need to be executed without interruption from other processes. The particular reasons for quiescing the database server are not critical to the invention.

In order to minimize disruptions of resource consumers using the computer system, such as resource consumers using the PC client 102 or the application server 104, the computer system is quiesced by configuring the system to prevent resource consumers, such as processes 112, 114, 116 from starting new activity on the computer system. Any of the processes 112, 114, 116 that are already running on the computer system, however, are allowed to complete operations without being quiesced. The new activity that is prevented from starting is optionally stored in a queue maintained by the DBMS 124. When the reasons for quiescing the computer system have been resolved, the computer system is restored to normal operations and the DBMS 124 starts processing the queued processes again. Alternatively, the new activity is simply rejected by the DBMS 124 during the quiescence period.

An embodiment of one means for preventing resource consumers from starting new activity, in the context of a database system, will now be discussed in more detail. In this embodiment, the database system includes a scheduler 200, as shown in FIG. 2 and discussed above. This scheduler is configured to use various resource plans, such as plans 300, 500, as discussed above.

In an embodiment, a quiescence plan 800, as shown in FIG. 8, is provided for the scheduler 200. The quiescence plan 800 includes the OLTP group 302 and BATCH group 304, as described above. The active session limits for the OLTP group 302 is set to a quiescence value of zero (0). Thus, as discussed above, any new sessions which come into scheduler 200 from the OLTP group 302 will exceed the active session limit defined for the OLTP group 302, and will thus be queued by the scheduler. A timeout value of 60,000 (approx. 17 hours) is also specified for the OLTP group 302. As discussed above, this timeout value is the length of time the session will be kept on the queue before it is aborted. A long value has been selected here, to ensure that the sessions will not time out while the maintenance is being performed. The particular value specified is a design choice for those skilled in the art, and is not critical to the invention. The BATCH group 304 similarly includes an active session limit of zero and a timeout of 60,000.

The quiescence plan 800 also includes a maintenance group 810. The maintenance group 810 has no session limit defined for it. Therefore, the scheduler 200 will accept an unlimited number of sessions in the maintenance group 810. Since there is no limit to the number of sessions in the maintenance group 810, there is no need for a timeout value, as no sessions will be queued. The quiescence plan 800 thus blocks any new sessions from the OLTP group 302 and the BATCH group 304 from being executed on the DBMS 124, while allowing new sessions from the maintenance group 810 to be executed without hindrance.

The quiescence plan 800 is activated as discussed above for selecting an active plan or method. Once the quiescence plan 800 is activated, the new session limits of zero act to block all new activity from the resource consumer groups 302, 304 and cause that activity to be queued. Any existing activity that is running at the time the quiescence plan 800 is activated is not affected by the change in plans, and is allowed to execute undisturbed. Maintenance is then performed on the computer system, using sessions belonging to maintenance plan 810.

Once the maintenance is completed, the quiescence plan 800 is de-activated and replaced with another resource plan, such as the plans 300, 500, as discussed above. The computer system then proceeds to process sessions according to the newly activated resource plan, including processing the sessions queued during the maintenance period.

System Architecture Overview

Figure 9:
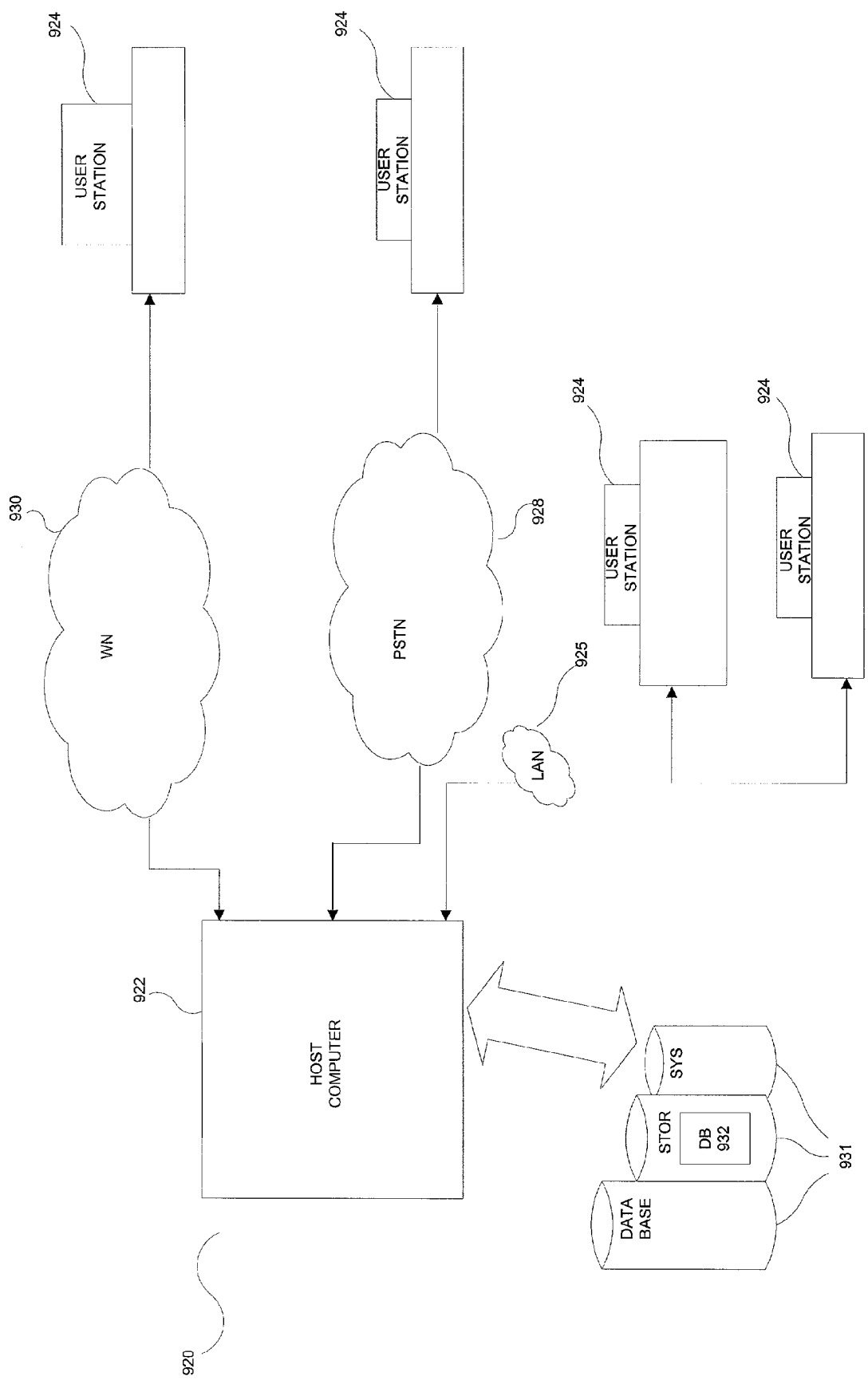
FIG. 9 is a representation of a computer system in accordance with an embodiment of the invention.

Referring to FIG. 9, in an embodiment, a computer system 920 includes a host computer 922 connected to a plurality of individual user stations 924. In an embodiment, the user stations 924 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 924 are connected to the host computer 922 via a local area network ("LAN") 925. Other user stations 924 are remotely connected to the host computer 922 via a public telephone switched network ("PSTN") 928 and/or a wireless network 930.

In an embodiment, the host computer 922 operates in conjunction with a data storage system 931, wherein the data storage system 931 contains a database 932 that is readily accessible by the host computer 922.

In alternative embodiments, the database 932 may be resident on the host computer, stored, e.g., in the host computer's ROM, PROM, EPROM, or any other memory chip, and/or its hard disk. In yet alternative embodiments, the database 932 may be read by the host computer 922 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 922 can access two or more databases 932, stored in a variety of mediums, as previously discussed.

Figure 10:
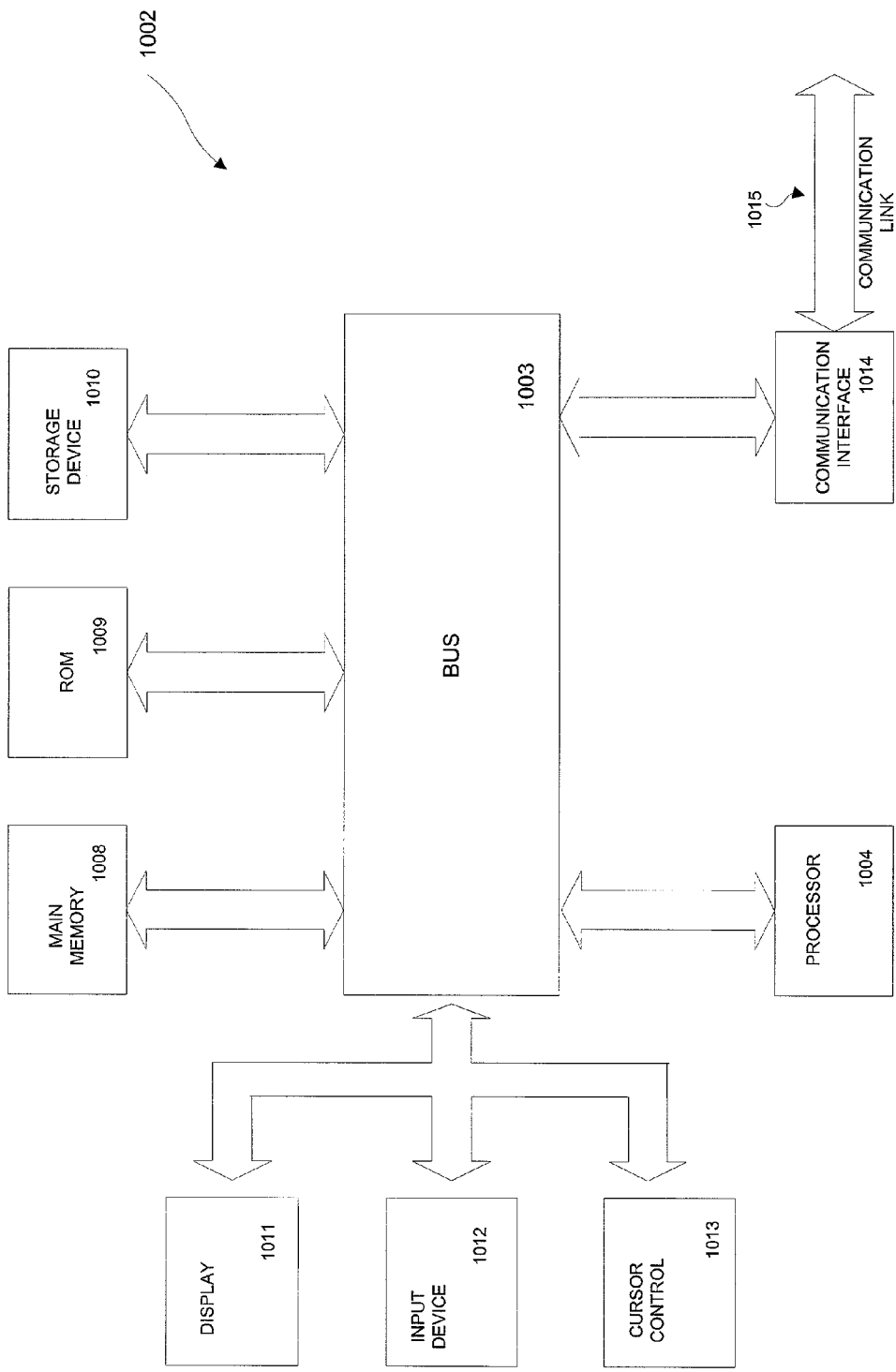
FIG. 10 is a representation of a processing unit in accordance with an embodiment of the invention.

Referring to FIG. 10, in an embodiment, each user station 924 and the host computer 922, each referred to generally as a processing unit, embodies a general architecture 1002. A processing unit includes a bus 1003 or other communication mechanism for communicating instructions, messages and data, collectively, information, and one or more processors 1004 coupled with the bus 1003 for processing information. A processing unit also includes a main memory 1008, such as a random access memory (RAM) or other dynamic storage device, coupled to the bus 1003 for storing dynamic data and instructions to be executed by the processor(s) 1004. The main memory 1008 also may be used for storing temporary data, i.e., variables, or other intermediate information during execution of instructions by the processor(s) 1004.

A processing unit may further include a read only memory (ROM) 1009 or other static storage device coupled to the bus 1003 for storing static data and instructions for the processor(s) 1004. A storage device 1010, such as a magnetic disk or optical disk, may also be provided and coupled to the bus 1003 for storing data and instructions for the processor(s) 1004.

A processing unit may be coupled via the bus 1003 to a display device 1011, such as, but not limited to, a cathode ray tube (CRT), for displaying information to a user. An input device 1012, including alphanumeric and other keys, is coupled to the bus 1003 for communicating information and command selections to the processor(s) 1004. Another type of user input device may include a cursor control 1013, such as, but not limited to, a mouse, a trackball, a fingerpad, or cursor direction keys, for communicating direction information and command selections to the processor(s) 1004 and for controlling cursor movement on the display 1011.

According to one embodiment of the invention, the individual processing units perform specific operations by their respective processor(s) 1004 executing one or more sequences of one or more instructions contained in the main memory 1008. Such instructions may be read into the main memory 1008 from another computer-usable medium, such as the ROM 1009 or the storage device 1010. Execution of the sequences of instructions contained in the main memory 1008 causes the processor(s) 1004 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1004. Such a medium may take many forms, including, but not limited to, non-volatile and volatile media. Non-volatile media, i.e., media that can retain information in the absence of power, includes the ROM 1009. Volatile media, i.e., media that can not retain information in the absence of power, includes the 5 main memory 1008.

Common forms of computer-usable media include, for example: a floppy disk, flexible disk, hard disk, magnetic tape, any other magnetic medium, CDROM, any other optical medium, punchcards, papertape, any other physical 15 medium with patterns of holes, RAM, ROM, PROM (i.e., programmable read only memory), EPROM (i.e., erasable programmable read only memory), including FLASH-EPROM, any other memory chip or cartridge, or any other medium from which a processor 1004 can retrieve information.

Various forms of computer-usable media may be involved in providing one or more sequences of one or more instructions to the processor(s) 1004 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1003 may receive the infrared signals and place the instructions therein on the bus 1003. The bus 1003 may carry the instructions to the main memory 1008, from which the processor(s) 1004 thereafter retrieves and executes the instructions. The instructions received by the main memory 1008 may optionally be stored on the storage device 1010, either before or after their execution by the processor(s) 1004.

Each processing unit may also include a communication interface 1014 coupled to the bus 1003. The communication interface 1014 provides two-way communication between the respective user stations 924 and the host computer 922. The communication interface 1014 of a respective processing unit transmits and receives electrical, electromagnetic or optical signals that include data streams representing various types of information, including instructions, messages and data.

A communication link 1015 links a respective user station 924 and a host computer 922. The communication link 1015 may be a LAN 925, in which case the communication interface 1014 may be a LAN card. Alternatively, the communication link 1015 may be a PSTN 928, in which case the communication interface 1014 may be an integrated services digital network (ISDN) card or a modem. Also, as a further alternative, the communication link 1015 may be a wireless network 930.

A processing unit may transmit and receive messages, data, and instructions, including program, i.e., application, code, through its respective communication link 1015 and communication interface 1014. Received program code may be executed by the respective processor(s) 1004 as it is received, and/or 25 stored in the storage device 1010, or other associated non-volatile media, for later execution. In this manner, a processing unit may receive messages, data and/or program code.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

What is claimed is:

1. A computer implemented method for quiescing resource consumer activity in a computer system, comprising:
   preventing a first resource consumer of a first group from starting a new activity on the computer system based upon a first resource plan, wherein
      the first resource plan comprises a configurable limit on a first maximum number of active sessions for the first group on the computer system,
      when the first configurable limit is configured to a quiescence value of zero, the first configurable limit is configured to limit the number of newly active session for the first group to zero, wherein
         no new sessions in the first group are allowed to become active, and
         all currently active sessions in the first group are allowed to continue; and
   allowing one or more second resource consumer of a second group to continue an already-running activity on the computer system based upon a second resource plan for the second group,
      wherein the first resource plan and the second resource plan are adapted in order to allow one or more third resource consumers of a third group to start a new activity by respectively preventing the first resource consumer from starting a new activity and by allowing zero or more second resource consumer to continue an already-running activity; and
   replacing the first resource plan or the second resource plan with a third resource plan upon completion of operation of the third group.

2. The method of claim 1, wherein the prevented activity is queued.

3. The method of claim 1, wherein the computer system further comprises a second configurable value associated with a fourth group, the fourth group comprising zero or more resource consumers, the second configurable value being adapted to define a second number of active sessions the fourth group is allowed to have running in the computer system, further comprising:
   configuring the second configurable value to a value adapted to allow one or more active sessions from the fourth group to be run while the first configurable value is set to the quiescence value.

4. The method of claim 1, wherein sessions prevented from becoming active are queued.

5. The method of claim 1, in which the configurable limit on the maximum number of active sessions is zero.

6. The method of claim 1, wherein the number of active sessions is limited not to exceed the configurable limit.

7. The computer implemented method of claim 1, in which the first resource plan comprises a resource sub-plan for allocating the system resource within the first group.

8. The computer implemented method of claim 1, in which the first resource plan comprises no limit on a maximum number of active sessions for the second group.

9. The computer implemented method of claim 1, in which the first resource plan allocates the system resource according to a respective weight associated with at least one of the first group and the second group.

10. The computer implemented method of claim 1, further comprising:
    deactivating and replacing the first resource plan or the second resource plan with the third resource plan upon completion of operation of the third group.

11. The computer implemented method of claim 1, in which the third group comprises a process for maintaining the computer system.

12. A method for quiescing a computer system, the computer system operating according to a first resource plan, comprising:
    replacing the first resource plan with a second resource plan, wherein the second resource plan identifying a first resource consumer group and a second resource consumer group,
       the second resource plan being adapted to prevent the first resource consumer group from starting new activity on the computer system in order to allow the second resource consumer group to start and complete a new activity on the computer system, the second resource plan comprising a configurable limit that represents a limit on a number of active sessions for the first group on the computer system, and when the configurable limit is configured to a quiescence value of zero, the configurable limit is configured to limit the number of newly active session for the first group to zero, wherein no new sessions in the first group are allowed to become active and all currently active sessions in the first group are allowed to continue.

13. The method of claim 12, wherein the number of active sessions of the first resource consumer group is limited not to exceed the configurable limit.

14. A computer program product that includes a medium useable by a processor, the medium storing thereon a sequence of instructions which, when executed by said processor, causes said processor to execute a method for quiescing resource consumer activity in a computer system, the method comprising:

preventing a first resource consumer of a first group from starting a new activity on the computer system based upon a first resource plan, wherein the first resource plan comprises a configurable limit on a first maximum number of active sessions for the first group on the computer system, when the first configurable limit is configured to a quiescence value of zero, the first configurable limit is configured to limit the number of newly active session for the first group to zero, wherein no new sessions in the first group are allowed to become active and all currently active sessions in the first group are allowed to continue; and allowing one or more second resource consumer of a second group to continue an already-running activity on the computer system based upon a second resource plan for the second group, wherein the first resource plan and the second resource plan are adapted in order to allow one or more third resource consumer of a third group to start a new activity by respectively preventing the first resource consumer from starting a new activity and by allowing zero or more second resource consumer to continue an already-running activity; and replacing the first resource plan or the second resource plan with a third resource plan upon completion of operation of the third group.

15. The computer program product of claim 14, wherein the prevented activity is queued.

16. The computer program product of claim 14, wherein the computer system further comprises a second configurable value associated with a second group, the second group comprising one or more resource consumers, the second configurable value being adapted to define a second number of active sessions the second group is allowed to have running in the computer system, further comprising:

configuring the second configurable value to a value adapted to allow one or more active sessions from the second group to be run while the first configurable value is set to the quiescence value.

17. The computer program product of claim 14, wherein sessions prevented from becoming active are queued.

18. The computer program product of claim 14, in which the configurable limit on the maximum number of active sessions is zero.

19. The computer program product of claim 14, wherein the number of active sessions is limited not to exceed the configurable limit.

20. A computer program product that includes a medium useable by a processor, the medium storing thereon a sequence of instructions which, when executed by said processor, causes said processor to execute a method for quiescing a computer system, the computer system operating according to a first resource plan, the method comprising:

replacing the first resource plan with a second resource plan, wherein the second resource plan identifying a first resource consumer group and a second resource consumer group, the second resource plan being adapted to prevent the first resource consumer group from starting new activity on the computer system in order to allow the second resource consumer group to start new activity on the computer system, the second resource plan comprising a configurable limit that represents a limit on a number of active sessions for the first group on the computer system, and when the configurable limit is configured to a quiescence value of zero, the configurable limit is configured to limit the number of newly active session for the first group to zero, wherein no new sessions in the first group are allowed to become active and all currently active sessions in the first group are allowed to continue.

21. The computer program product of claim 20, wherein the number of active sessions of the first resource consumer group is limited not to exceed the configurable limit.

22. A system for quiescing a user activity in a computer system, comprising:

a processor adapted to implement a first resource plan and a second resource plan;

a processor adapted to prevent a first resource consumer of a first group from starting a new activity on the computer system based upon the first resource plan, wherein the first resource plan comprises a configurable limit on a first maximum number of active sessions for the first group on the computer system, when the first configurable limit is configured to a quiescence value of zero, the first configurable limit is configured to limit the number of newly active session for the first group to zero, wherein no new sessions in the first group are allowed to become active, and all currently active sessions in the first group are allowed to continue;

means for allowing one or more second resource consumer of a second group to continue an already-running activity on the computer system based upon the second resource plan for the second group, wherein the first resource plan and the second resource plan are adapted in order to allow one or more third resource consumer of a third group to start a new activity by respectively preventing the first resource consumer from starting a new activity and by allowing zero or more second resource consumer to continue an already-running activity; and means for replacing the first resource plan or the second resource plan with a third resource plan upon completion of operation of the third group.

23. The system of claim 22, further comprising a means for scheduling which prevents the first group of resource consumers from starting new activity while allowing the second group of resource consumers to start new activity.

24. The system of claim 22, wherein the new activity prevented from starting of the first resource consumer is queued.

25. The system of claim 22, in which the configurable limit on the maximum number of active sessions is zero.

26. A system for quiescing a computer system the computer system operating according to a first resource plan, comprising:
- means for replacing the first resource with a second resource plan, wherein
  - the second resource plan identifying a first resource consumer group and a second resource consumer group,
  - the second resource plan being adapted to prevent the first resource consumer group from starting new activity on the computer system in order to allow the second resource consumer group to start and complete a new activity on the computer system,
  - the second resource plan comprising a configurable limit that represents a limit on a number of active sessions for the first group on the computer system, and
  - when the configurable limit is configured to a quiescence value of zero, the configurable limit being configured to limit the number of newly active session for the first resource consumer group to zero, wherein
    - no new sessions in the first resource consumer group are allowed to become active on the computer system, and
    - all currently active sessions in the first resource consumer group are allowed to continue.

27. The system of claim 26, wherein the computer system further comprises a second configurable value associated with a second resource consumer group, the second resource consumer group comprising one or more resource consumers, the second configurable value being adapted to define a second number of active sessions that the second resource consumer group is allowed to have running in the computer system, wherein the second configurable value is configured to a value adapted to allow one or more active sessions from the second resource consumer group to be run, while the first configurable value is set to the quiescence value.

28. The system of claim 26, wherein sessions prevented from becoming active are queued.

29. The system of claim 26, wherein the number of active sessions of the first resource consumer group is limited not to exceed the configurable limit.

* * * * *

UNITED STATES PATENT AND TRADEMARK OFFICE
CERTIFICATE OF CORRECTION

| | | |
|---|---|---|
| PATENT NO. | : 7,451,448 B1 | Page 1 of 1 |
| APPLICATION NO. | : 09/967068 | |
| DATED | : November 11, 2008 | |
| INVENTOR(S) | : Rhee et al. | |

It is certified that error appears in the above-identified patent and that said Letters Patent is hereby corrected as shown below:

In column 4, line 41, delete "chose" and insert -- choose --, therefor.

In column 14, line 52, after "physical" delete "15".

In column 15, line 34, before "stored" delete "25".

In column 17, line 9, in Claim 12, after "active" insert -- , --.

In column 17, line 32, in Claim 14, after "active" insert -- , --.

In column 18, line 26, in Claim 20, after "active" insert -- , --.

Signed and Sealed this

Fourth Day of May, 2010

David J. Kappos
*Director of the United States Patent and Trademark Office*